United States Patent [19]

Boenke et al.

[11] 3,836,888

[45] Sept. 17, 1974

[54] VARIABLE MESSAGE LENGTH DATA ACQUISITION AND RETRIEVAL SYSTEM AND METHOD USING TWO-WAY COAXIAL CABLE

[76] Inventors: Clyde O. Boenke, 1409 Orborview Blvd.; Murray H. Miller, 1534 Glastonbury, both of Ann Arbor, Mich. 48103; Michael R. Levine, 3605 Fredrick; Victor H. Rigotte, B595 Greenbrier Blvd., both of Ann Arbor, Mich. 48105; Weston E. Vivian, 2717 Kerutworth Dr.; William C. Hall, 10 Ridgeway, both of Ann Arbor, Mich. 48104

[22] Filed: May 22, 1972

[21] Appl. No.: 255,477

[52] U.S. Cl. .................... 340/172.5, 178/DIG. 13, 178/DIG. 22, 178/5.6, 178/66 R

[51] Int. Cl. ........ G06f 3/04, H04j 9/00, H04n 7/14

[58] Field of Search ............... 178/66 R, 58, 5.6, 79, 178/113, 17; 179/15 BA, 15 BV, 15 FD, 2 DP, 84 VF; 343/175; 340/176, 172.5, 166 R, 173 SP, 174 SP, 172 S, 36 SR

[56] References Cited

UNITED STATES PATENTS

| | | | |
|---|---|---|---|
| 3,003,143 | 10/1961 | Beurrier | 340/347 |
| 3,308,439 | 3/1967 | Tink et al. | 340/172.5 |
| 3,310,778 | 3/1967 | Grundfest et al. | 340/166 |
| 3,500,327 | 3/1970 | Belcher et al. | 340/154 |
| 3,526,892 | 9/1970 | Bartlett et al. | 340/365 |
| 3,535,692 | 10/1970 | Papke | 340/166 |
| 3,560,936 | 2/1971 | Busch | 340/172.5 |
| 3,564,509 | 2/1971 | Perkins et al. | 340/172.5 |
| 3,569,943 | 3/1971 | Mackie et al. | 340/172.5 |
| 3,571,806 | 3/1971 | Mackie et al. | 340/172.5 |
| 3,579,197 | 5/1971 | Stapleford | 340/172.5 |
| 3,585,598 | 6/1971 | Hudson et al. | 340/172 S |
| 3,599,160 | 8/1971 | Nestle et al. | 340/172.5 |
| 3,623,003 | 11/1971 | Hewitt | 340/172.5 |
| 3,623,010 | 11/1971 | Burkaalter | 340/172.5 |
| 3,626,379 | 12/1971 | Wrigley | 340/172.5 |
| 3,629,859 | 12/1971 | Copland et al. | 340/172.5 |
| 3,647,976 | 3/1972 | Moses | 179/15 AL |
| 3,668,307 | 6/1972 | Face et al. | 178/5.6 |
| 3,668,312 | 6/1972 | Yamamoto et al. | 178/6.8 |
| 3,675,513 | 7/1972 | Flanagan et al. | 179/84 VF |
| 3,676,846 | 7/1972 | Busch | 340/146.1 BA |
| 3,676,858 | 7/1972 | Finch et al. | 340/172 S |
| 3,700,820 | 10/1972 | Blasbalg et al. | 179/15 BV |
| 3,701,851 | 10/1972 | Starrett | 179/15 BY |

OTHER PUBLICATIONS

R. K. Jurgen, "Two Way Applications for Cable Television Systems in the 70's," IEEE Spectrum, November 1971, pp. 39–54.

*Primary Examiner*—Paul J. Henon
*Assistant Examiner*—James D. Thomas
*Attorney, Agent, or Firm*—Sughrue, Rothwell, Mion, Zinn & Macpeak

[57] ABSTRACT

A control computer is connected via a coaxial cable to a plurality of remote terminals. Data and command signals are transmitted in the forward direction from the computer to the terminals by time-multiplexing the signals on one channel of the cable and data and request signals are transmitted in the return direction from the terminal to the computer by time-multiplexing these signals on a different channel of the cable. Each terminal is equipped with several input-output devices which operate at different speeds. The computer operates at high speed to fill its main memory with commands. An interface is connected between the computer and the cable and is capable of operating at different speeds, i.e., at different time intervals between transmissions of digital words to different terminals or between repeated transmissions to the same terminal. It normally operates at a speed lower than the speed of the computer to service the low speed terminal devices. However, when a command for a high speed operation at a terminal is recognized, the interface enters a burst mode which supplies commands to the terminal at the high speed of the computer. Transmission in the forward direction is accomplished by frequency shift keying, and in the return direction by phase shift modulation. Words are transmitted serial-by-bit. Each terminal has a unique means for storing its permanent terminal address parallel-by-bit for comparison with serial address bits transmitted by the computer. The terminals are divided into several different major groups. The computer addresses the terminals by first transmitting a major address to select the proper group, and then sends a minor address to select the terminal within the major group. Each terminal is provided with a local storage and a novel keyboard for entering request codes into the storage. Each terminal is also provided with a visual display means for displaying data transmitted from the computer. A novel one-line display also provides the terminal with a visual display of the information entered on the keyboard or a message sent to the terminal.

8 Claims, 28 Drawing Figures

FIG I
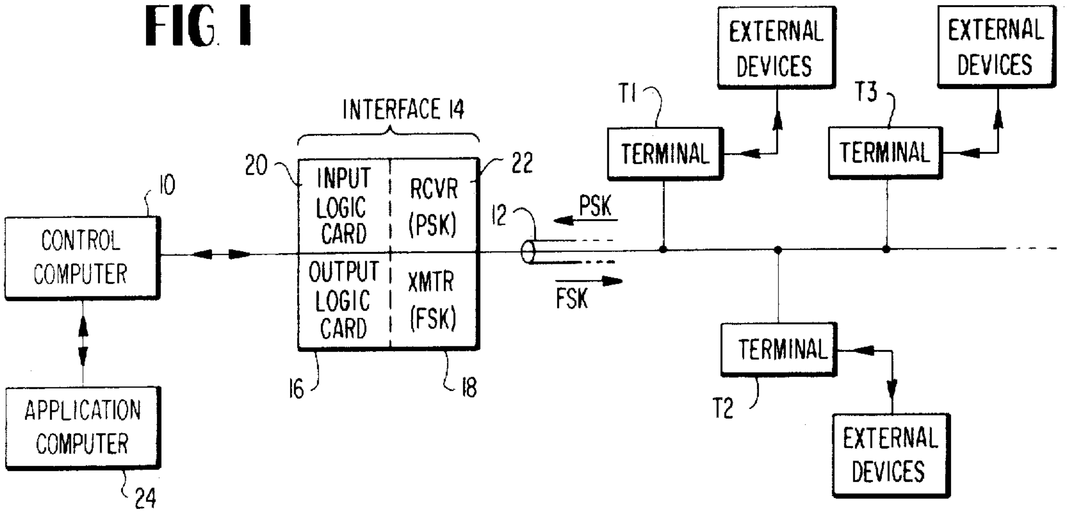
FIG 2
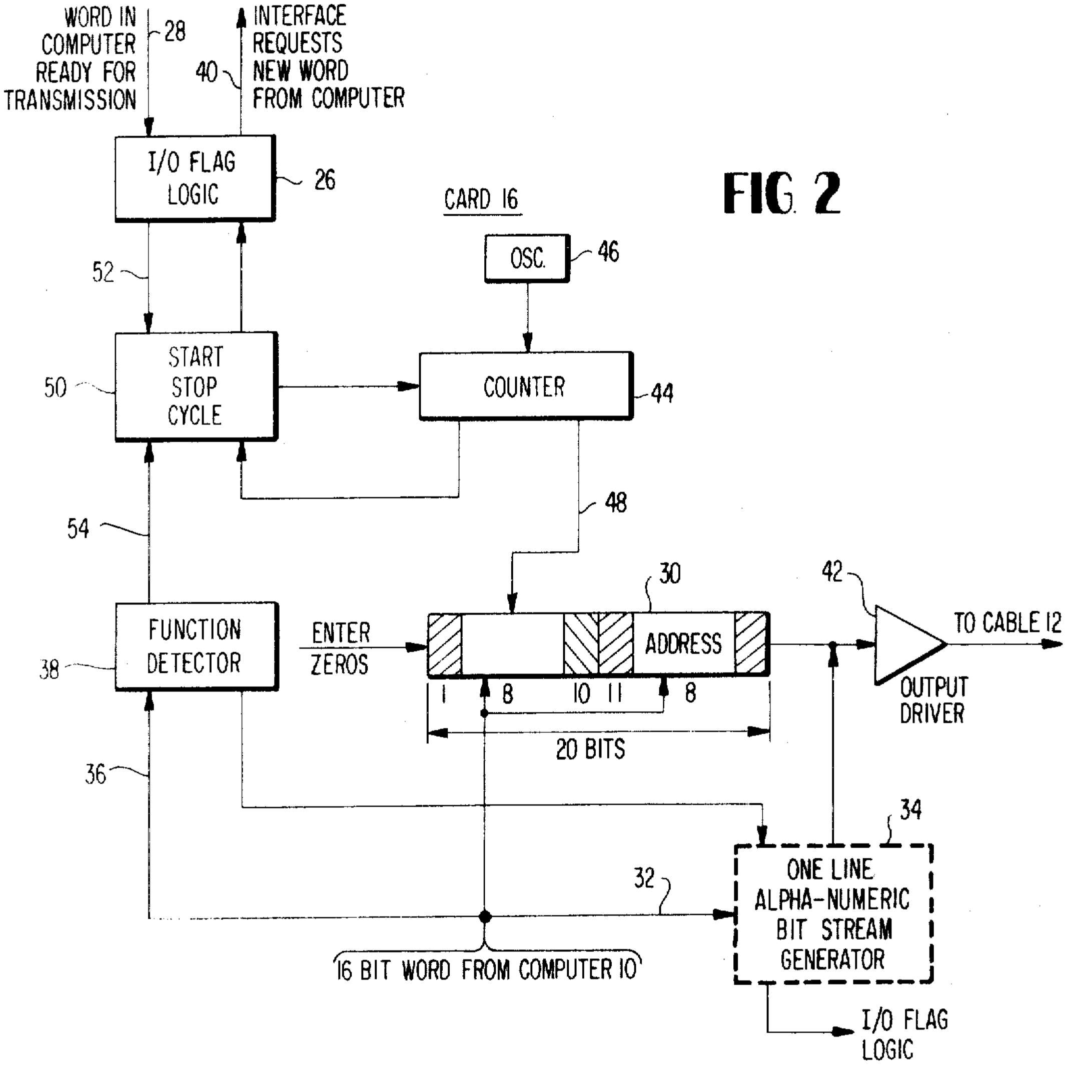

PATENTED SEP 17 1974 3,836,888

SHEET 06 OF 14

FIG II
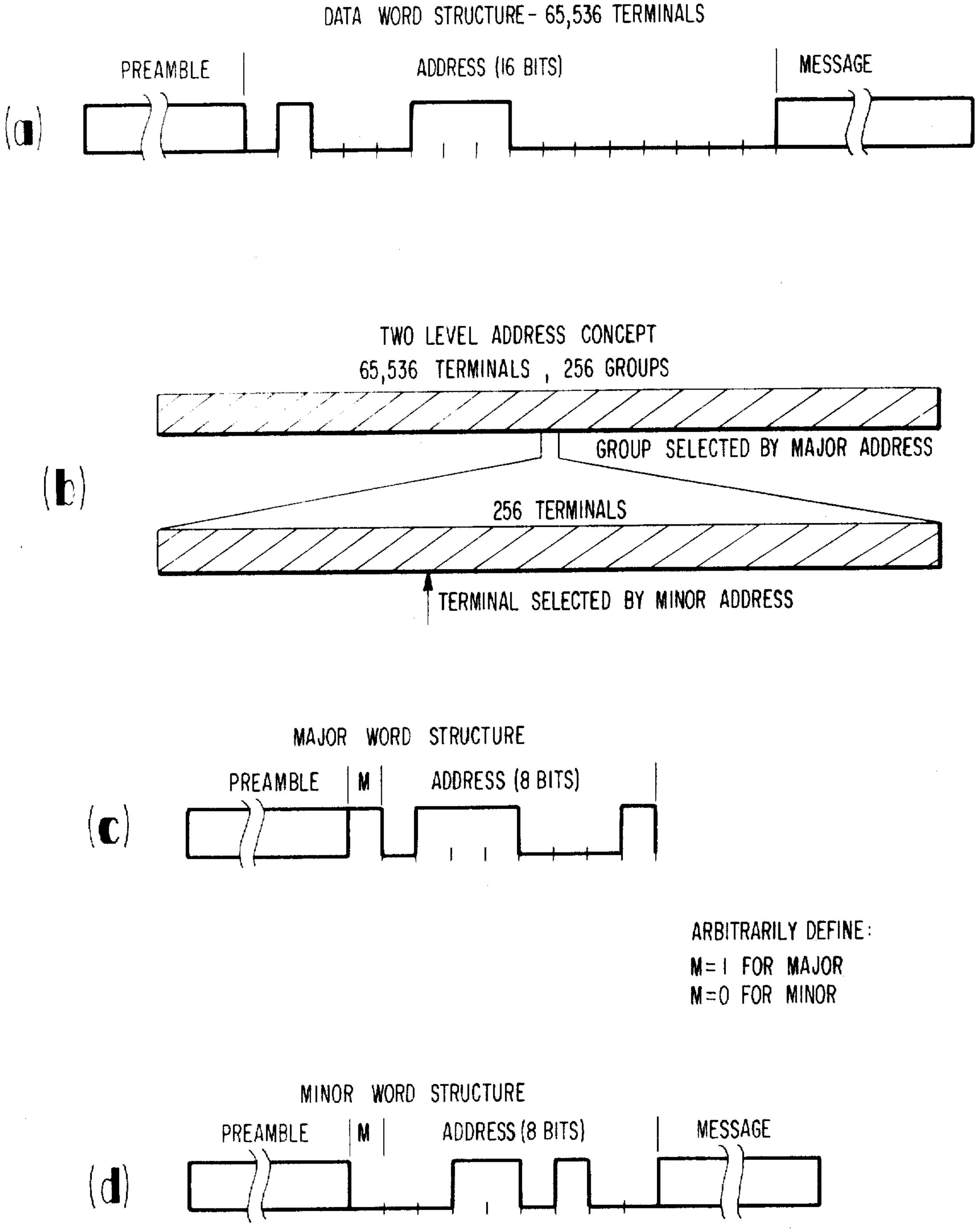

| BIT CONNECTED TO: | MAJOR | MINOR |
|---|---|---|
| LINE 1 | 0 | 0 |
| LINE 2 | 1 | 1 |
| LINE 3 | 1 | 0 |
| LINE 4 | 0 | 1 |
FIG 13
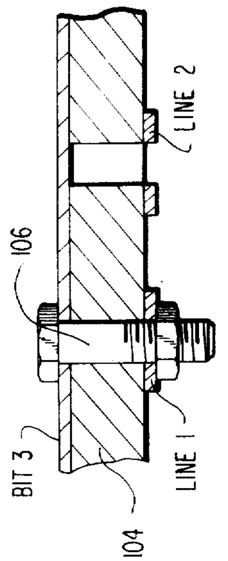
FIG 14
FIG 12
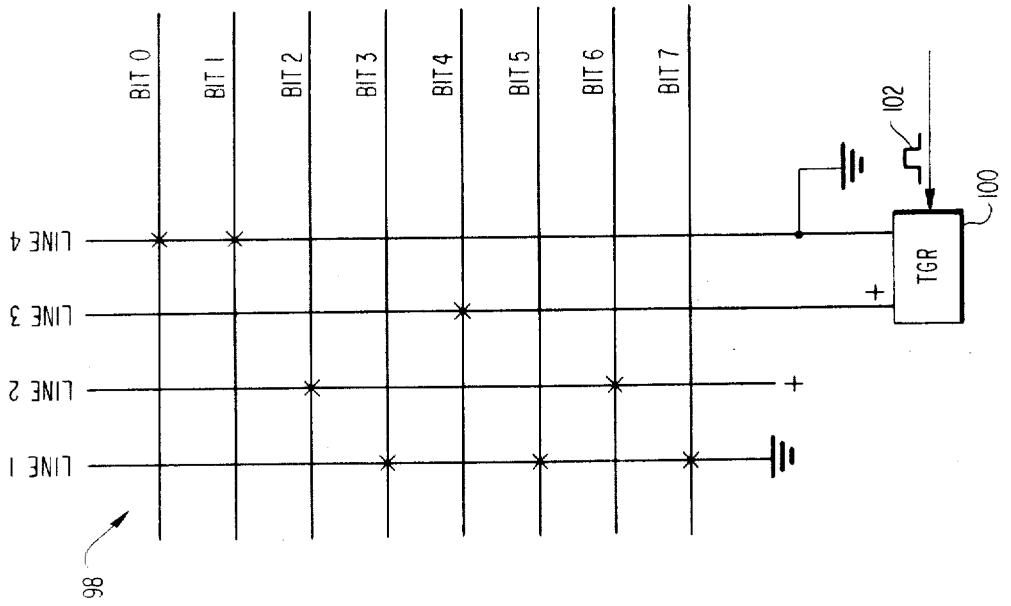

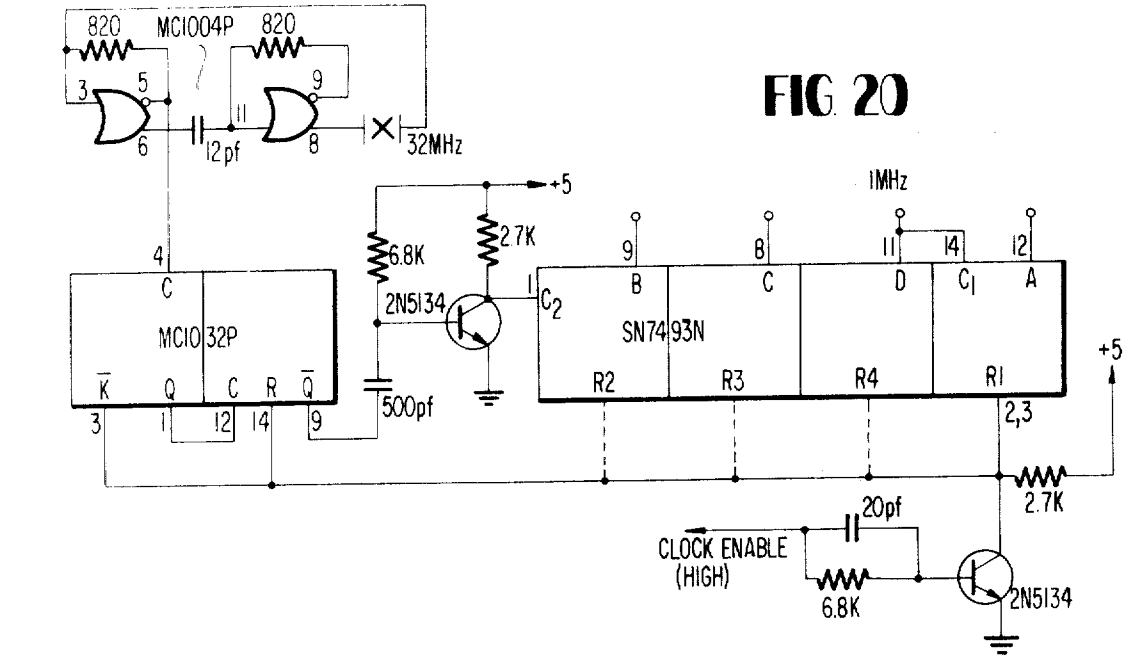
FIG. 20
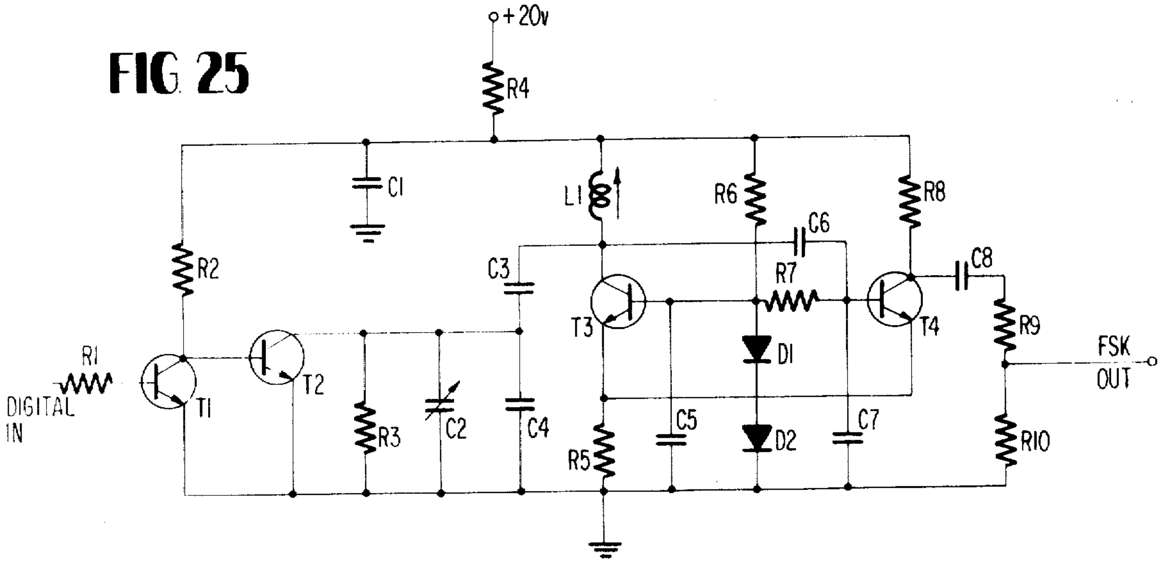
FIG. 25
| | | | | | |
|---|---|---|---|---|---|
| R1 | 470 | C1 | .01 µf | L1 | 1µh |
| R2 | 1.5K | C2 | 7-25pf | | |
| R3 | 1M | C3 | 10pf | T1,T2 | 2N5134 |
| R4 | 33 | C4 | 25pf | T3,T4 | 2N5182 |
| R5 | 1K | C5 | .01µf | | |
| R6 | 20K | C6 | 10pf | D1, D2 | 1N4148 |
| R7 | 220 | C7 | 25pf | | |
| R8 | 75 | C8 | 250pf | | |
| R9 | 820 | | | | |
| R10 | 82 | | | | |
| ALL 1/4 WATT | | | | | |
FIG. 26

VARIABLE MESSAGE LENGTH DATA ACQUISITION AND RETRIEVAL SYSTEM AND METHOD USING TWO-WAY COAXIAL CABLE

CROSS-REFERENCE TO RELATED APPLICATION

This application is an improvement on the invention disclosed and claimed in copending application Ser. No. 24,009, filed Mar. 30, 1970, now U.S. Pat. No. 3,668,307, and entitled "Two-Way Community Antenna Television System".

BACKGROUND OF THE INVENTION

This invention relates to the field of digital data collection, communication and display, and, more particularly, to an improved apparatus and method for computer-addressing a plurality of remote terminals, providing means for inputting data to the terminals, transmitting data between the computer and selected terminals, and displaying data at the terminals.

The apparatus and method are accomplished by employing time-multiplexing and frequency splitting on a two-way broadband coaxial transmission cable, such as used in CATV.

SUMMARY OF THE INVENTION

The broad object of this invention is to provide a variable message length data acquisition and retrieval system and method employing a two-way transmission line, such as a coaxial cable used in CATV, connected between a control computer and a plurality of remote terminals.

Another object is to provide such a system and method in which an interface between a control computer and the cable determines the length of data messages, and thereby the rate at which data is transmitted along the cable to a selected remote terminal in accordance with the speed demands of the particular function to be performed at the terminal. The interface also provides other functions which will be described in detail below.

Another object is to provide an improved method for addressing a selected terminal or terminals by the control computer.

Another object is to provide an improved method of encoding and storing the address of each remote terminal therein.

Another object is to provide an improved frequency shift keying (FSK) transmitter for the transmission of data from the computer and through the cable to the remote terminals.

Another object is to provide an improved overtone crystal oscillator for use in each remote terminal for providing a carrier for the transmission of data from the terminal to the computer by phase shift modulation (PSM) and for providing digital clocking pulses for clocking the various logic circuits in the terminal.

Another object is to provide an improved method and system for entering data into a terminal via a keyboard.

The invention may be briefly summarized as a variable message length data acquisition and retrieval system which utilizes the braodband, bidirectional capabilities inherent in a coaxial cable. When such cable is part of a CATV network, the system brings to the subscriber services beyond the passive delivery of entertainment and information. This invention makes it possible for the subscriber to participate actively in the programming he receives. Two-way data transmission is an integral feature of the invention and opens the door to services beyond television programming, thereby giving the subscriber access to educational, medical, community and special interest information as well as to computer services. The aforementioned copending application is expressly incorporated herein by reference to supply background information on a CATV system in which a plurality of remote terminals are connected via a television coaxial cable to a control computer at the head end of a system. As described in that application, each terminal contains many external devices which may communicate with the control computer via the terminal and the coaxial cable over different channels in a time-multiplexed mode on each channel.

In addition, this system may be used as a tool for business or industry, either on public cable or dedicated cable, for high speed data transmission, computer access, data access record keeping, etc.

The heart of the system is a control computer and computer-to-cable interface which can service thousands of individual terminals throughout the cable system on a time-shared basis. Data leaves the computer and is distributed throughout the system by a carrier frequency shift keying (FSK) link lying just above the FM broadcast band. Data returns from each terminal in short bursts of carrier phase shift keyed (PSK) signals within the reverse frequency spectrum of the cable. Both data links operate on a 1-microsecond bit length, thereby giving a fixed 1-mega bit per second data transfer rate.

Since various functions of the terminals are performed at different intervals ranging from 0.01 to many seconds, the output interface is capable of recognizing the type of operation to be performed from the information provided it by the computer, and has a variable word interval capability corresponding to the speed of the function being performed at the terminal, for communicating with a terminal via the coaxial cable at the fixed bit rate. More specifically, the interface normally supplies data messages comprising only one or two words only several times per second to any one terminal, but in response to recognizing an appropriate identifier bit, may enter a burst mode to transmit a message consisting of many words to the remote terminal via the coaxial cable.

Each terminal is provided with a novel means for encoding its local address in parallel bit form for subsequent comparison by the computer generated addresses on a serial bit basis.

BRIEF DESCRIPTION OF THE DRAWINGS

FIG. 1 is a block diagram of the preferred mode of a data communication system embodying this invention.

FIGS. 2 and 4 are schematic block diagrams of the cable output and input logic cards, respectively, of the interface of FIG. 1.

FIGS. 11*a*, *b*, *c* and d illustrate the sequence of events for the two-level address system and method.

FIG. 12 is a schematic diagram of a two-level address storage matrix.

FIG. 14 is a partial sectional view of FIG. 12.

FIG. 18 is a diagram of a prior art oscillator.

FIG. 20 is a detail schematic diagram of the oscillator shown in FIG. 19.

FIG. 25 is a detailed schematic circuit diagram of an improved FSK oscillator.

FIG. 26 is a table of component values for the circuit of FIG. 25.

DESCRIPTION OF THE PREFERRED EMBODIMENTS

Figure 5A:
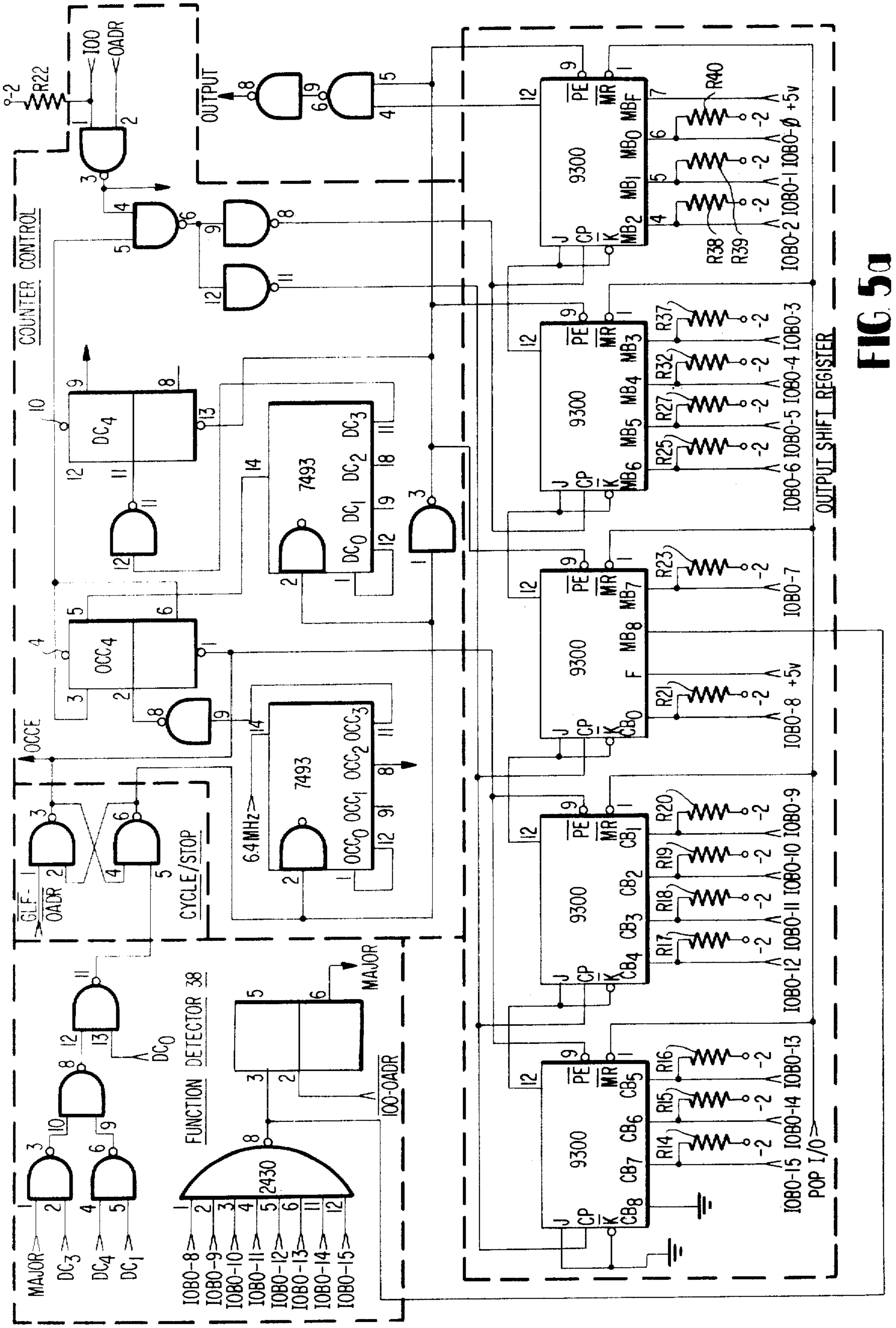
FIGS. 5*a*, *b* and 6*a*, *b* are detailed schematic logic circuit diagrams of the block diagrams illustrated in FIGS. 2 and 4, respectively.

FIG. 1 is a block diagram illustrating the over-all system concept of a preferred embodiment of the invention. A control computer 10 communicates with a plurality of remote terminals T1, T2, T3 . . . via a coaxial cable 12. Coupled between the control computer and the cable is an interface 14 which performs several functions, such as controlling the length of interval of data messages transmitted to the terminals, verifying the terminal addresses associated with return words from the terminals, determining the status of the terminals, etc. Associated with each terminal is a plurality of external devices, such as a TV camera, a microphone, a television set, an analog-to-digital converter coupled to various condition sensors, remote control devices, a TV monitor and/or printer for displaying alphanumeric data, and remote control devices. Data is transmitted from the interface along one channel of the cable in a time-multiplexed mode by means of frequency shift keying (FSK) modulation. Transmission in this direction is controlled by an output logic card 16 (shown in detail in FIG. 5) and an FSK transmitter 18 in the interface 14. Data and requests from the terminals are transmitted along another channel of the cable in time-multiplexed mode by a phase shift keying modulator (PSK) to the interface 14. Transmission in this direction is controlled by an input logic card 20 (shown in detail in FIG. 6) and a PSK receiver 22 in the interface 14.

In the preferred embodiment of the invention, the control computer 10 interrogates or addresses all terminals known to be active so that each such terminal is sampled faster than its expected usage rate. It does this in a manner which efficiently uses the transmission system. It retains information as to the types and classes of data which the various terminals are allowed to enter and to retrieve. It formats a message to each terminal based on the types of peripheral or external units attached to the terminal and on the data format desired by the terminal user. It interprets and formats returning data according to instructions received from the terminal and according to the requirements of an application computer 24 which is coupled to the control computer 10 and which operates upon data returned from each terminal and generates data to be transmitted to each terminal.

The interpretation of any data word from a terminal is dependent on prior information received from the terminal. The prior information, entered via a special code called a Language Code, is used to give the effect of a much larger family of terminal return codes. For example, if data entry is made by a small keyboard at a remote terminal, the effective size of the keyboard can be modified through the use of various Language Codes which allow each button on the keyboard to have many different meanings. For example, one Language Code might cause all subsequent codes to be inputs to an arithmetical calculated program, while another might cause subsequent codes to control a remote device. Still another Language Code would redefine the codes to be requests for the retrieval of information from a data bank.

Figure 5B:
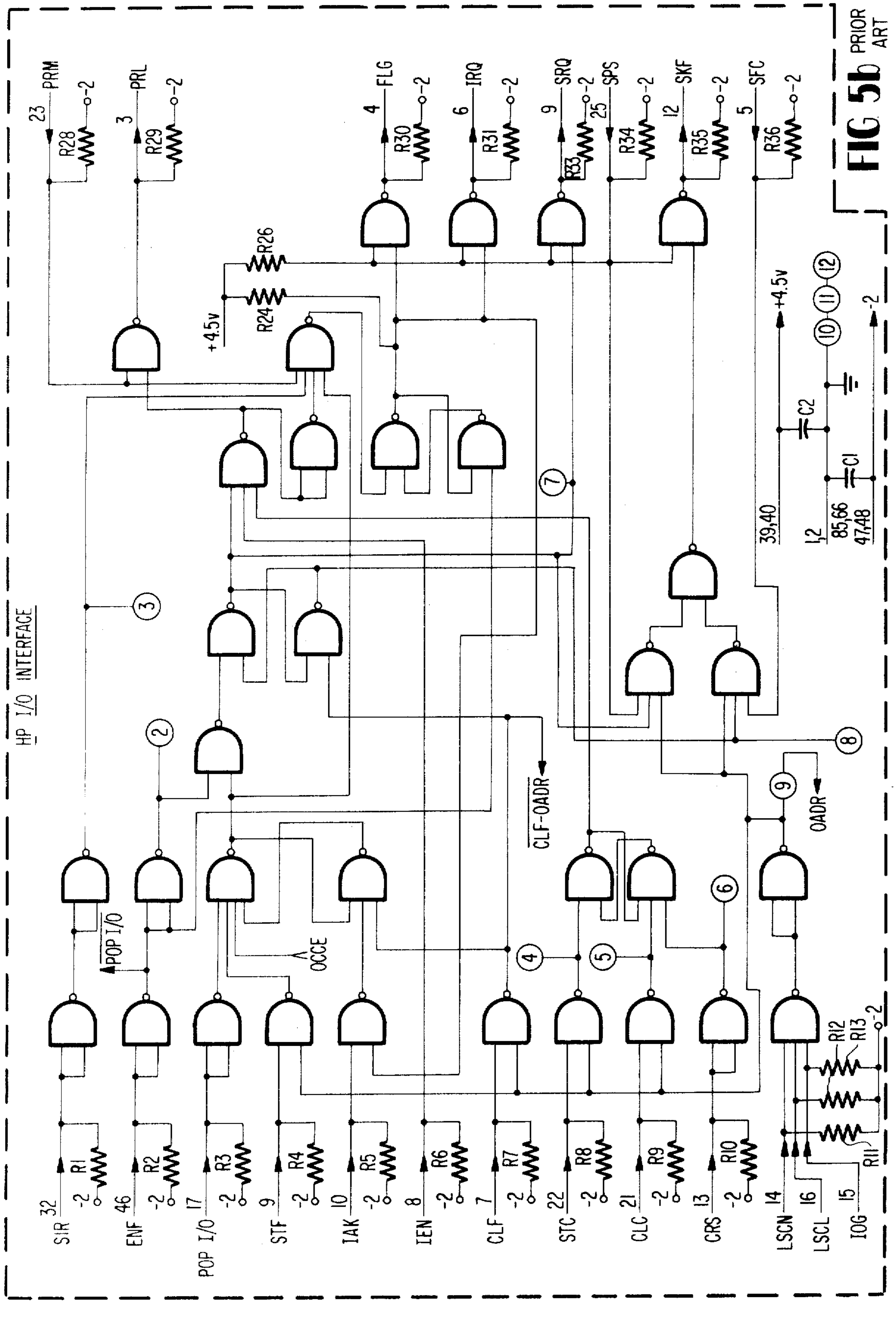
FIG 5b PRIOR ART
Figure 6A:
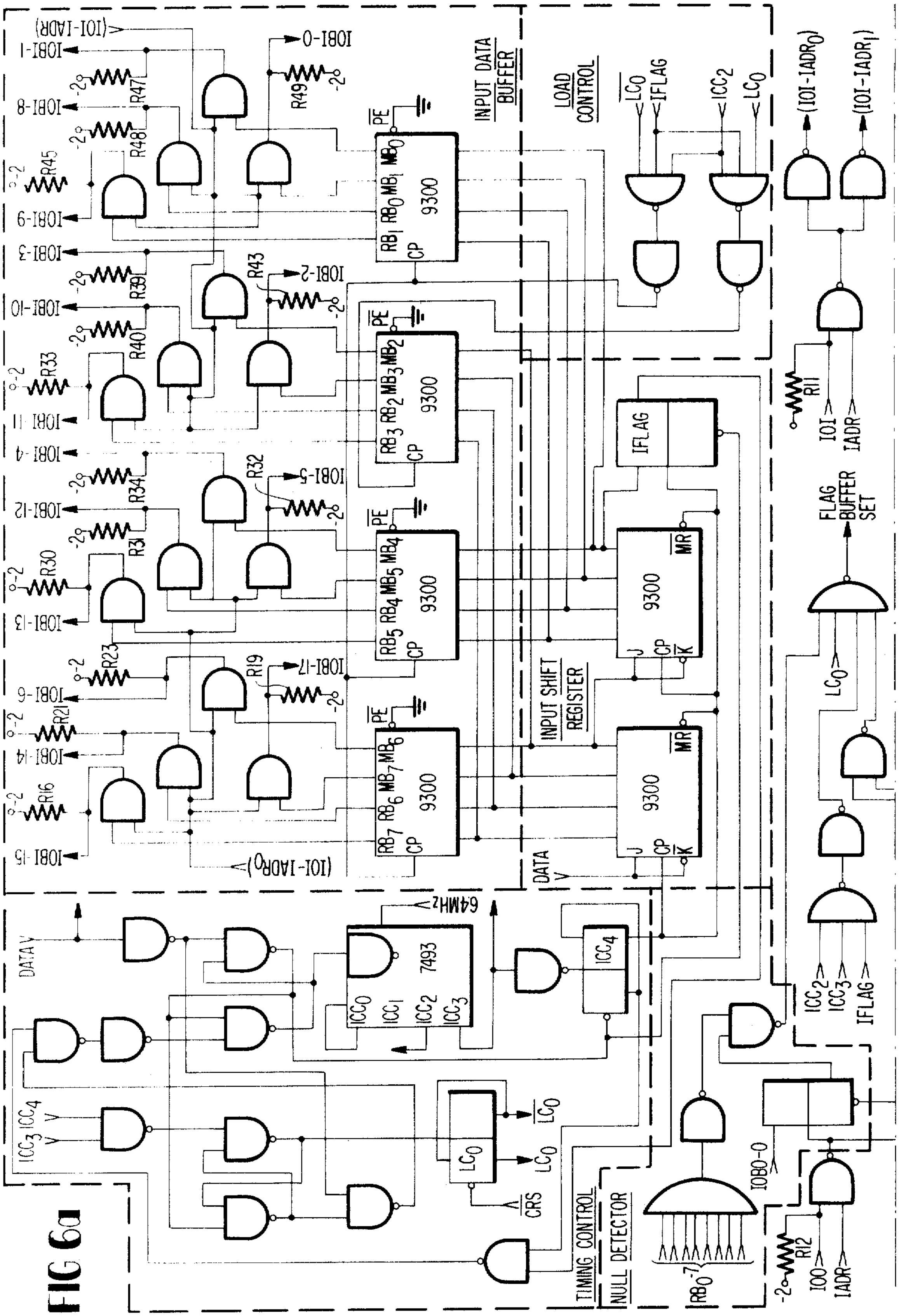
Figure 6B:
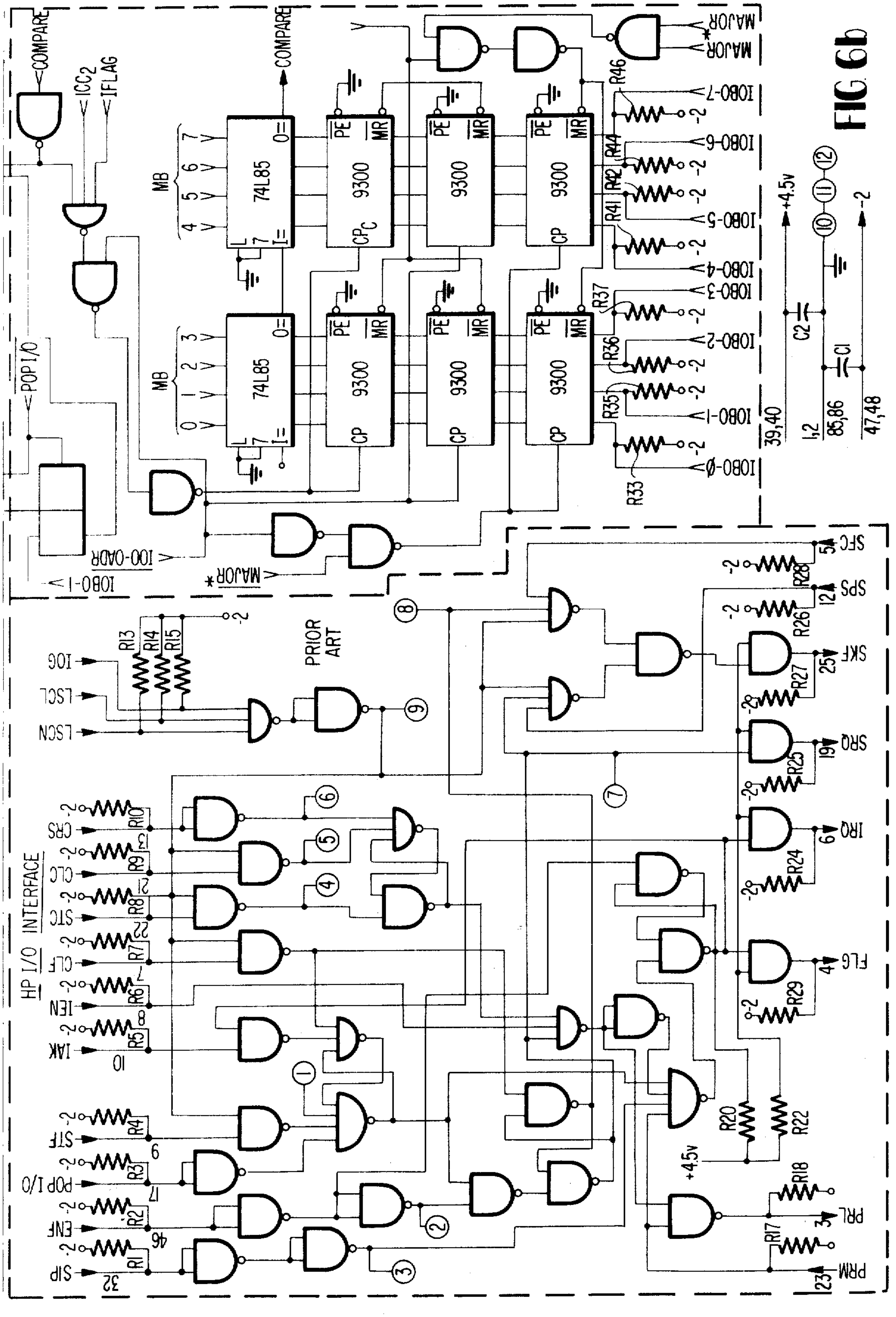

The cable output logic card 16 (FIG. 5) and the cable input logic card 20 (FIG. 6) of interface 14 are two separate circuit cards which are inserted into the input/output slots in the control computer 10. The interface logic circuit illustrated in FIG. 5*b* is a prior art circuit purchased from Hewlett Packard Co. and identified as "Output Interface HP 2100 Series Computer to Cable." The interface logic circuit illustrated on the left side of FIG. 6*b* is also a prior art circuit purchased from Hewlett Packard Co. and identified as "Input Interface HP 2100 Series Computer to Cable." As will be described in more detail below, each remote terminal is assigned a major address and a minor address. When the computer transmits a major address, only those remote terminals having that major address are conditioned to receive a subsequent minor address. In other words, the terminals are divided into groups, with all the members of each group having the same major address but different minor addresses. In the preferred embodiment of the invention, the computer generates sixteen-bit words. Furthermore, each major and minor address contains eight bits.

FIG. 2 is a schematic logic diagram of the cable output logic card 16. An I/O flag logic circuit 26 receives on line 28 instructions from the computer 10 which indicate the presence of a new word by activating the logic circuit 26. The sixteen-parallel bit word appears simultaneously at three locations. One location is a standard 20-bit output register 30; the second location is on the input line 32 of a One Line Alphanumeric Bit Stream Generator 34; and the third location is the input line 36 of a function detector or decoder 38.

Function detector 38 determines whether the new computer input word is a major terminal address, a minor terminal address followed by a command, a minor address followed by an alphanumeric display character, or a minor address followed by a one or any-line alphanumeric message. The function detector then determines the length of time the interface internal clock will run in order to output the correct message onto the cable 12 and also determines when the interface 14 will request another word from the computer 10 via the output line 40 of the I/O flag logic circuit 26. The length of the count-out sequence depends on the data type which also determines the time interval for the output sequence. The time interval ends when the interface card 16 sets the BUSY flag for the computer. This time interval thus determines the maximum rate for each data type. The data types may, for example, be: (1) an 8 bit command word or byte; (2) a 16 byte message for the one-line-alphanumeric mode; or (3) a 256 byte message.

The contents of register 30 are shifted out via an output driver 42 to cable 12 under the control of a counter 44 which in turn is driven by a continuously operating oscillator 46. The shift pulses appear on the counter output line 48. The initiation and termination of each counter cycle is under the control of a Start-Stop Cycle circuit 50 which in turn is controlled by the output of logic circuit 26 via line 52 and the output of the function detector 38 via the line 54.

Bit 1 of output register 30 is hard-wired "true" as a START bit, as is also register bit 11. The first eight bits of the word are loaded into register bit positions 2 through 9. The second eight bits of the computer word are loaded into register bits 12–20; register bit 10 is set to indicate whether the address inputted is a major or minor terminal address.

For a major address, an output count of 10 from counter 44 determines the end of this transmission condition. When the 10 bits are shifted out of register 30, zeroes are shifted into the register continuously, so that after each transmission the cable 12 is filled with zeroes. Therefore, when no information is being transmitted, the FSK receiver in the remote terminal is maintained in a zero state, thereby minimizing the effect of spurious signals between transmissions. The START bit of a word indicates a new transmission. Function detector 38 introduces a delay of 176 microseconds, that is, it allows counter 44 to run for an additional 176 counts before sending a signal to circuit 50 to set flag logic circuit 26 in a condition to request via line 40 a new word from computer 10. Assuming one-microsecond bits, this delay produces a so-called normal transmission mode or speed of 5,000 words per second.

For the minor address-command mode, that is, the mode in which the computer word consists of a terminal minor address followed by a terminal command, all positions of the 20-bit register 30 are shifted out, and thereby the output count of counter 44 is 20 microseconds, and the function detector 38 follows the same sequence which results in approximately a 200 microsecond delay between words, thereby again producing a transmission rate of 5,000 words per second.

For the minor address-alphanumeric character, i.e., the mode in which a minor address is followed by an alphanumeric character to be displayed on a TV monitor at the remote terminal, the output count of counter 44 is again 20 microseconds, and the function detector introduces a delay of only five microseconds before resetting the I/O flag logic circuit 26. This results in a burst mode rate of 40,000 words per second along the cable. The burst mode is terminated when register 30 receives a new minor address-command word, thus restoring the normal transmission rate of 5,000 words per second.

Figure 3:
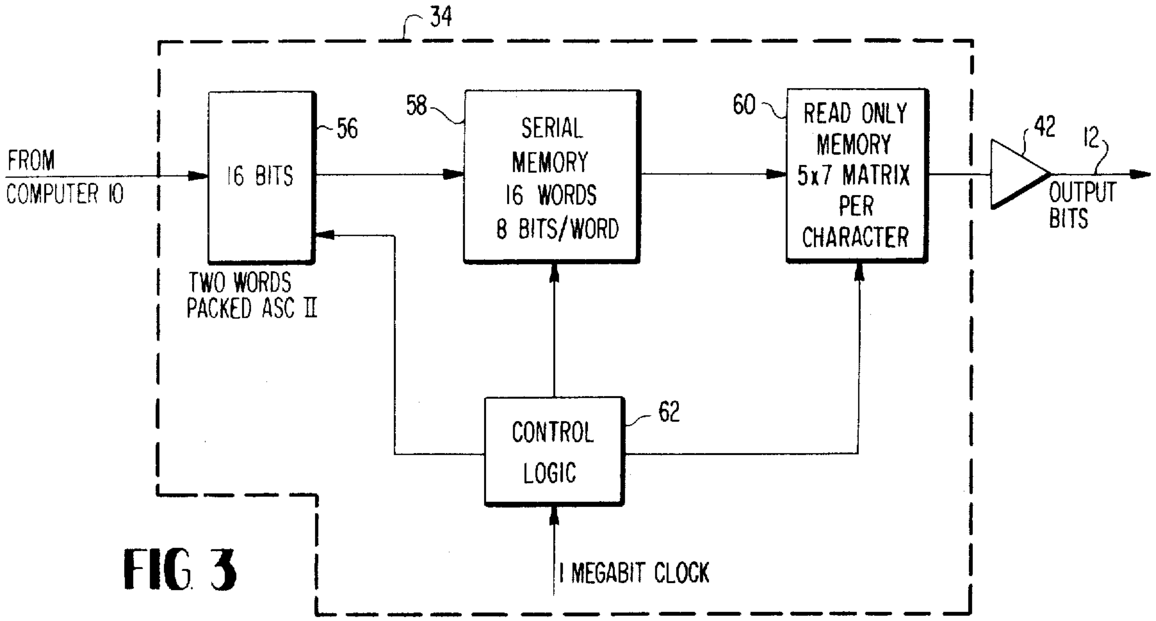
FIG. 3 is a schematic block diagram of the bit stream generator of FIG. 2.

A third mode of transmission occurs for a special output format used to drive remote terminals having TV monitors or receivers adapted to provide one-line displays of 16 alphanumeric characters. In this case, interface 14 transmits the actual bit pattern for each television line, rather than the alphanumeric ASC II character generated by the computer. When the function detector 38 recognizes such as request from the computer 10, it turns the control of the transmission over to the alphanumeric bit stream generator 34, a block diagram of which is illustrated in FIG. 3. The 16-bit word from computer 10 now contains two ASC II characters which are loaded in parallel into the bit stream in generator register 56 and then into a serial memory 58. The remaining seven words are also immediately read from the computer into the memory 58 with an elapsed time of approximately eight microseconds. The control logic 62 of the bit stream generator controls a read only memory 60 which translates the ASC II character into a 5 × 7 bit matrix, generates the sequential bit pattern for the seven television lines. The minor terminal address plus the 256 character bits are transmitted at a 1-megabit rate with no delays. The transmission is carried out under the control of a control logic circuit 62 which is driven by 1-megabit clock pulses. This transmission is repeated three more times until 1024 bits, comprising the 16 characters, are transmitted to the selected remote terminal. The entire transmission time is slightly over 1 millisecond for this mode. After the transmission is completed, the function detector 38 is reset to the normal transmission mode of 5,000 words per second.

Figure 4:
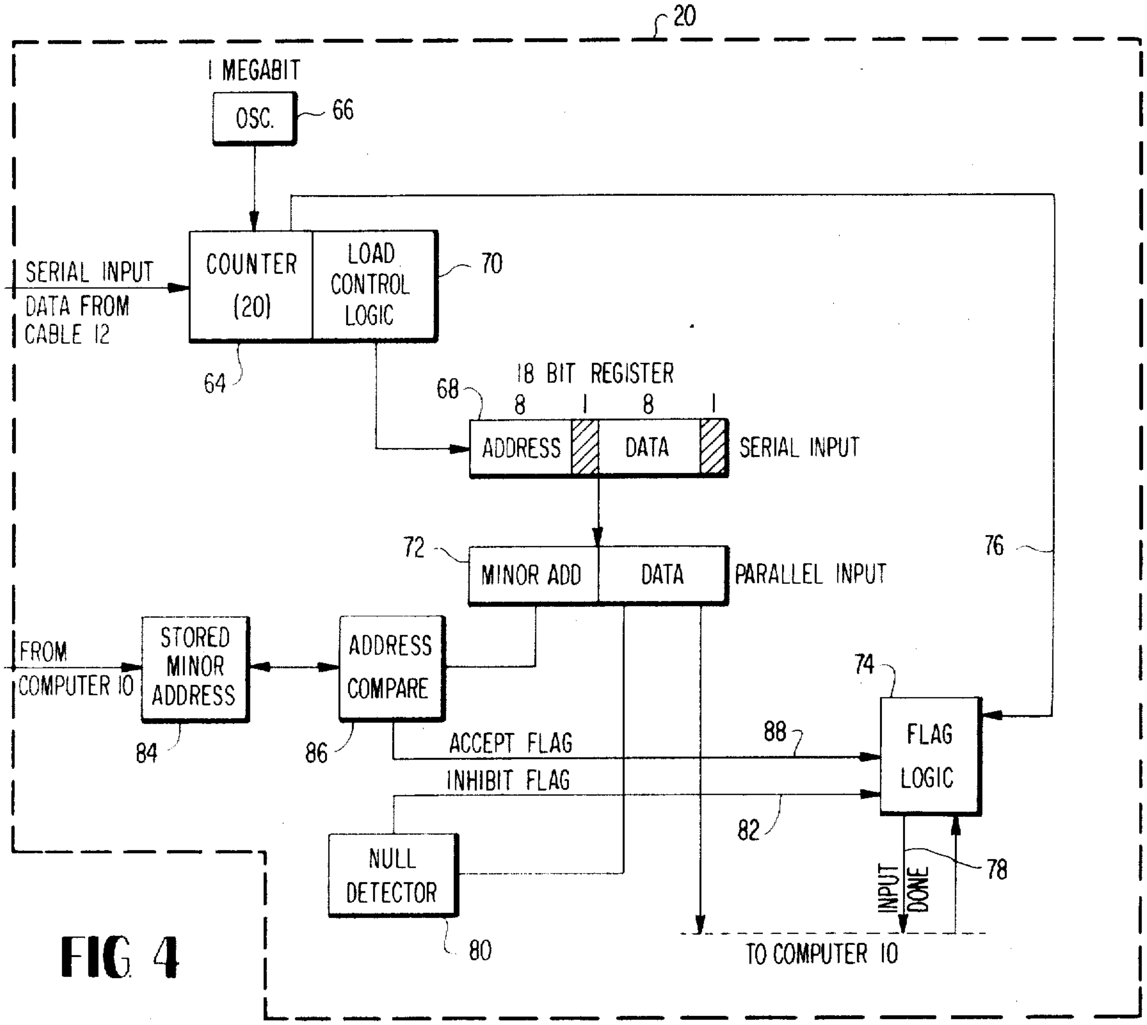

FIG. 4 illustrates a block diagram of the cable input logic card 20 of interface 14. The purpose of the logic circuit on this card is to recognize serial bit stream data from the remote terminals and convert it to a 16-bit parallel form acceptable to the computer 10.

The serial bits from cable 12 are clocked by a counter 64 and a 1-megabit oscillator 66 into an 18-bit shift register 68. The leading START bit of the data bit stream initiates the counting operation of the counter. When nine bits (START plus eight data) have been clocked into the last nine positions register 68, a load control logic circuit 70 causes the eight data bits to be loaded in parallel into the right half of the 16-bit data register 72. The counter continues to clock in bits until the second START bit appears in the right hand bit position of the register 68, thereby causing the counter to stop and the eight bits of data to be loaded into the left half of the 16-bit data register 72. At this time, except for the options described below, the counter sends a signal to the flag logic circuit 74 via line 76 to cause an "INPUT DONE" flag signal to appear on line 78 to inform the computer 10 of the presence of the new data which the computer will accept when ready.

As optional features, it is possible to set up two conditions for which inputs from the remote terminal will be ignored. These conditions are set by outputting a command word to the cable input logic card 20. The first option is termed the null detector which may be turned on or off. If turned on, all terminal inputs whose data fields are null, i.e., no data, will be ignored by the computer by inhibiting the setting of the INPUT DONE flag output of the flag logic circuit 74. Consequently, the computer 10 will not be loaded down by unnecessary interrupts. This option is indicated in FIG. 4 by a null detector logic block 80 which detects a null data field in register 72 and sends an INHIBIT FLAG signal to the flag logic circuit 74 via the line 82.

The second option is a terminal address comparator. This option is turned on by outputting to the interface input card 20 from the computer 10 a command word containing an ON bit and the minor address of the terminal receiving the command or data from the computer. The minor address is entered into a storage register 84 at the same time the computer enters it in the output register 30 of the output logic card 16. When the minor address is returned from the terminal and stored in register 72, the addresses stored in registers 84 and 72 are compared in a comparator 86 which generates an ACCEPT FLAG signal on line 88 to set the INPUT FLAG in flag logic circuit 74. If the addresses do not match, all inputs are ignored until a match is obtained with the address stored in register 84.

In this variable message length data acquisition and retrieval system a communication channel is provided in each direction on the cable 12, and the channels are time-multiplexed among the remote terminals under control of the control computer 10 by an interrogate-reply sequence. Each terminal responds only to a predetermined digital bit pattern which is unique to it. The address bits become a part of each message sent from the computer 10 by the interface 14 and serves to direct the message to the terminal identified by the address.

Figure 7:
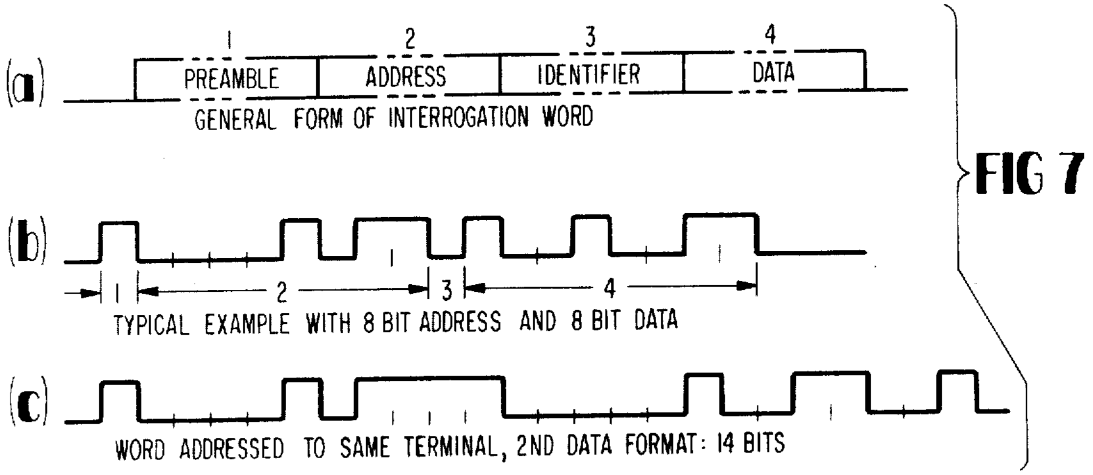
FIGS. 7*a*, *b* and *c* illustrate examples of an interrogation word from the computer.

One possible composition of the interrogation word is shown in FIG. 7*a*. The PREAMBLE is a code, often a single bit, signifying the start of a new word. The ADDRESS is the unique digital identification of the terminal chosen to respond to the message. The IDENTIFIER bit group defines the length and type of DATA which may be a control command for the terminal, a coded alphanumeric or other character, or data of a general nature intended for one of th peripheral or external devices associated with the terminal.

In the examples illustrated in FIGS. 7*b* and 7*c*, a single-bit PREAMBLE and an eight-bit ADDRESS are shown. A single IDENTIFIER bit gives two possible message formats. In FIG. 7*b*, with the IDENTIFIER bit set equal to zero, the data is an eight-bit word, perhaps a command to an internal function of the remote terminal. In FIG. 7*c*, the IDENTIFIER bit is set to one, and the DATA structure is 14 bits long, consisting of two seven-bit alphanumeric codes, for example. The IDENTIFIER format may also be variable. For example, th presence of a one in the first bit location may signify that additional IDENTIFIERS follow.

Figure 8:
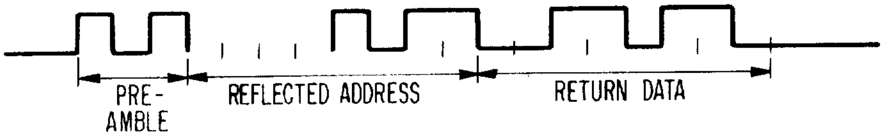
FIG. 8 illustrates a typical return code from a terminal.

Another word format describes the message which is sent back to the computer 10 from the remote terminal each time that terminal is interrogated, unless commanded to do otherwise. For example, some terminals, connected to devices which cannot by their nature generate a return message, may lack the hardware to transmit such a return. FIG. 8 shows a typical return code format. The inclusion of the address code is not mandatory, since responses will be generated only by those terminals interrogated; however, the reflection of the terminal address provides an additional address validity check in the optional address comparator of the interface 14, and also detects a null data field which would occur if an interrogator terminal was not in fact powered or connected to the cable. IDENTIFIER bits, although not shown, can also be used in the return message. However, changes, such as an increase in the total word length, require a priori knowledge at the control computer so that sufficient time will be allotted to the terminal to permit transmission of the entire message bit. This knowledge would exist, if for instance, the control computer commanded the terminal to return a longer message format.

Data returned from the terminal might consist of status indications from the terminal itself, alphanumerical or other characters entered into the terminal from external devices such as a keyboard, or data of an unspecified nature, such as machine status indications, analog-to-digital converter outputs, etc.

Figure 9:
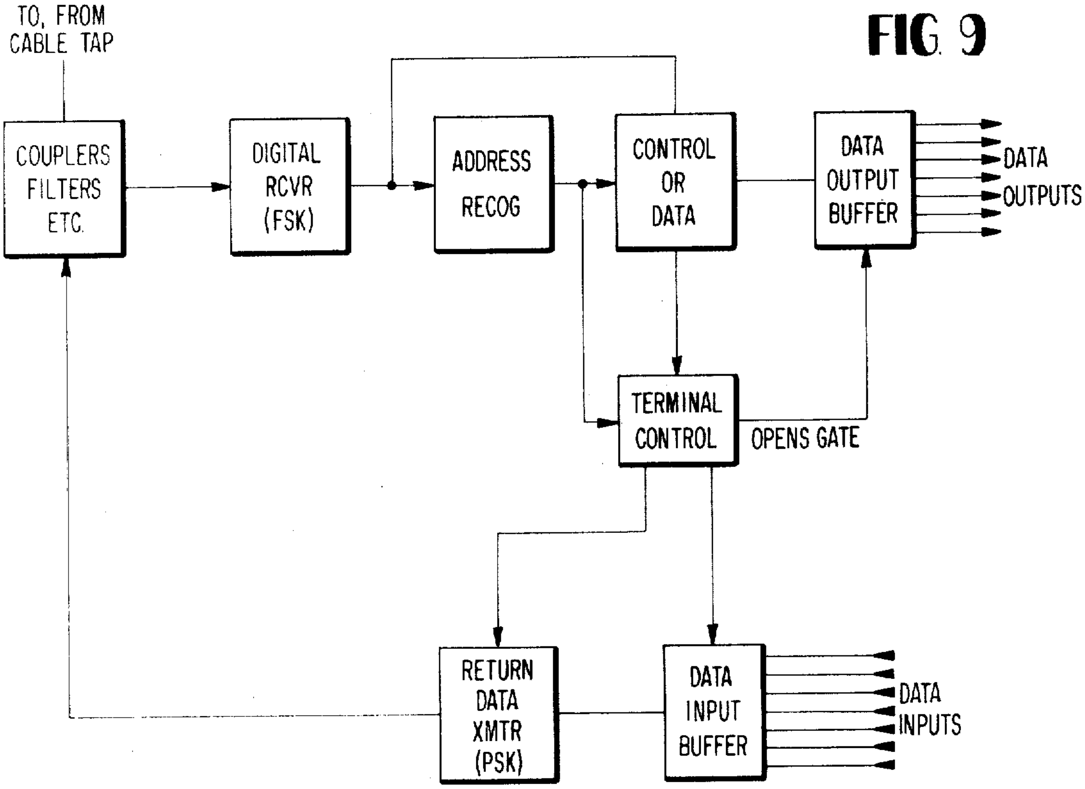
FIG. 9 is a block diagram of a basic general purpose terminal.

FIG. 9 is a block diagram of a basic general purpose remote terminal. The DATA OUTPUTS may be connected to any data sink, such as, but not limited to, an alphanumeric character generator, a data recording device (tape punch, card punch, magnetic tape deck, etc.), a numerically controlled manufacturing machine, or other user of data. The DATA INPUTS may be connected to any data source, such as, but not limited to, a data reading device (tape reader, card reader, magnetic tape unit, etc.), a numeric or alphanumeric keyboard, an analog-to-digital converter, or an industrial process monitor.

All of the above possible connections can co-exist in a single system, since the control computer can store enough information to allow different treatment of each terminal within a system.

Figure 10:
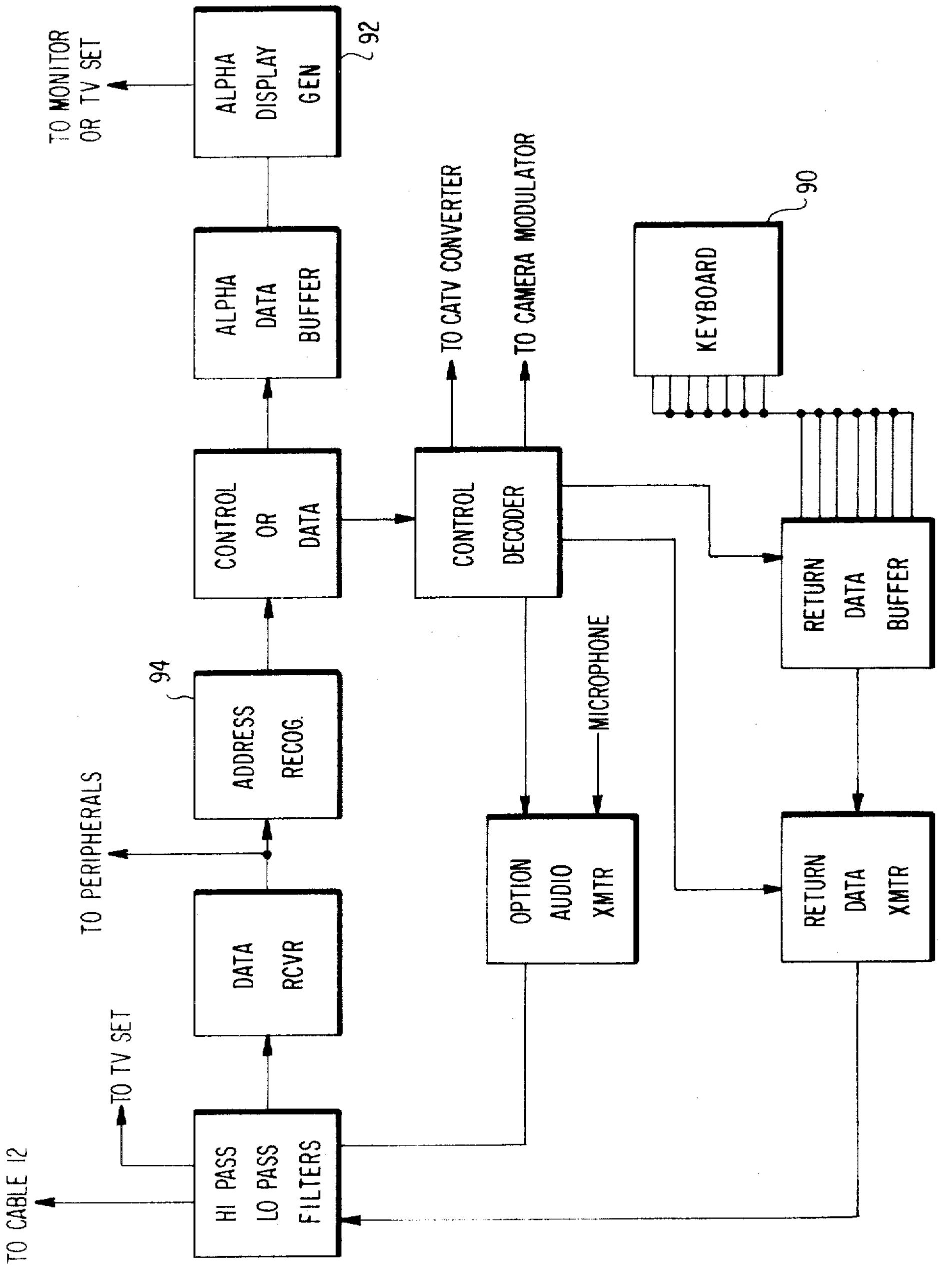
FIG. 10 is a block diagram of a specific terminal.

FIG. 10 illustrates a block diagrm of a specific terminal for use in the variable rate data acquisition and retrieval system and method of this invention. In FIG. 10, data is entered into the terminal via a keyboard 90, and this same data is displayed on a television set or video monitor connected to the alphanumeric character generator 92. Such a terminal in combination with a two-way co-axial cable has the advantages of high speed transmission and rapid access into the system as well as the language flexibility described above.

Another aspect of this invention involves the details of the ADDRESS RECOGNITION block 94 in FIG. 10. This block represents a remote data terminal address method and apparatus for use in the bi-directional broadband data transmission system described above in which the control computer 10 is connected by a co-axial cable 12 to a plurality of remote data terminals T1, T2, T3 . . . By means of this aspect of the invention, the terminal destination address of any message transmitted by the control computer may be efficiently coded, a corresponding local address stored in each terminal, and a comparison made between the address transmitted by the computer and the address stored in the terminal for the purpose of rendering each terminal responsive only to data or commands directed specifically to it.

In particular, this novel method combines the following:

1. An encoding method by which the address of each terminal contains one, two or more separate words to optimize the usage of the transmission medium.

2. A technique of local storage of each terminal's digital address in a non-volatile form with inherent visual read-out, and 3. A low cost means of comparing the address portion of each incoming word from the computer with the locally stored address and providing a digital indication of the result of such comparisons.

As an example of this novel encoding method, assume that more than 50,000 separate and unique terminal addresses are required. Since $2^{16}$ equals 65,536, 16 digital bits will identify the required number of terminals. In this case, 16 bits of address must be sent over the transmission system for each terminal interrogated. These 16 bits are in addition to any identifier bits, control bits, or data bits being sent to the terminal. However, one of the unique characteristics of the novel variable rate data acquisition and retrieval system of the method of this invention is that the remote terminals may be interrogated in any sequence. Thus, even though totally random addressing is possible, and, in fact, is a very useful feature of the invention, most terminals in the system may be interrogated in any conventional order. Suppose, for example, that the 65,536 possible addresses are divided into 256 major groups of 256 terminals each, and that a large number of terminals in each major group may be interrogated before a new major group is addressed. It is then seen that eight bits are required to define 256 addresses. In this aspect of the invention, therefore, two address levels of eight bits each are used, with the higher order level being termed the major address, i.e., the group address, and the lower order level being termed the minor address, i.e. the specific address of a terminal within a selected major group.

FIGS. 11*a*, *b*, *c* and *d* illustrate the sequence of events for this two level address system and method. In operation, the control computer 10 transmits a major address selecting one major group out of the 256 groups. This address is sent to all the remote data terminals, but only those in the selected major group are placed in a ready condition. The control computer then transmits the second level or minor address along with whatever data is to be transmitted to the addressed terminal. A response would occur only in the terminal of the previously selected major group which has a local minor address corresponding to the transmitted minor address. Any or all of the minor addresses may be sent before sending a new major address. Each terminal therefore requires only eight address bits plus an additional bit indicating whether the address is major or minor. The additional time used to send the major address is divided among many terminals and is not significant.

Of course, another possible partitioning of a sixteen-bit address would be four groups of four. Each terminal then would require four address bits and two address level identifier bits. Each sixteen terminal would require an additional six-bit word. Each sixteen of such groups would have an additional word. Finally, the highest address level would pick one of 16 super-groups. It is easily seen that partitioning greatly reduces the number of bits required to select each terminal, and, therefore, increases the number of such terminals which may be sampled in a given length of time.

Returning now specifically to the adress recognition block 94 in FIG. 10, a corresponding address configuration must be stored within each terminal in order to uniquely identify that terminal. If the two level, 16-bit major-minor address structure is used, two eight-bit words must be stored in each terminal. FIG. 12 schematically illustrates an eigh-by-four address storage matrix 98. The lines labelled Bit 0, Bit 1, BIT 2 . . . Bit 7 actually represent spaced horizontal conductor strips on one surface of a circuit board, and these eight bit lines represent the eight bits of the terminal address. The four vertical lines labelled LINE 1, LINE 2, LINE 3 and LINE 4 represent four spaced conductor strips on the opposite side of the circuit board.

In one embodiment of the invention, LINE 1 is attached to ground potential representing a O, LINE 2 is permanently connected to a positive potential representing a 1, LINE 3 is connected to one output of a bistable trigger or counter 100 and LINE 4 is connected to the other output of the trigger so that when a positive potential is applied to LINE 3, a ground potential is applied to LINE 4, and when a ground potential is applied to LINE 3 a positive potential is applied to LINE 4. The state of the trigger is changed upon the receipt of control pulse 102 whose generation will be described below.

To form the stored address of a local terminal, an electrical connection is made between each Bit and one of the LINES. Each connection in FIG. 12 is represented by an X. With such an arrangement, the single matrix provides both the major and minor address for the terminal. For example, for the connections indicated in FIG. 12, the stored major address beginning with Bit 7 is 01010100 and the minor address, again beginning with Bit 7, is 01000111. Once the particular terminal determines that its major address corresponds with the major address transmitted by the computer, the control pulse 102 is generated to change the state of the trigger and reverse the polarities of LINES 3 and 4 so that the matrix now stores the minor address in readiness for comparison with the minor address transmitted by the computer.

Figure 13:
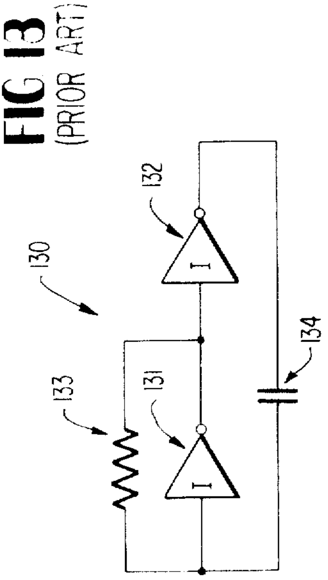
FIG 13 (PRIOR ART)
FIG. 13 is a truth table for the matrix of FIG. 12.

FIG. 13 is a truth table showing all the possible combinations of the connections of the Bits and LINES in FIG. 12.

FIG. 14 is a partial sectional view of an actual matrix which is schematically illustrated in FIG. 12 and shows the manner in which the connections between the LINES and the BITS are made. More specifically, in FIG. 14, Bit line 3 is shown as a conductor extending from left to right and deposited on the top surface of an insulated circuit board 104. LINES 1 and 2 are shown as conductor strips on the bottom surface of the board 104 and extending at right angles to the Bit conductor. A through hole passes through the board and conductors at each position where a Bit conductor and a LINE conductor overlap. When it is desired to make an electrical connection between a Bit conductor and a Line conductor, a threaded bolt 106 is passed through the corresponding through hole such that the head of the bolt physically and electrically contacts the Bit conductor, whilt the nut screwed on the bottom of the bolt physically and electrically contacts the LINE conductor, thereby electrically interconnecting the Bit and LINE conductors.

Figures 15, 17:
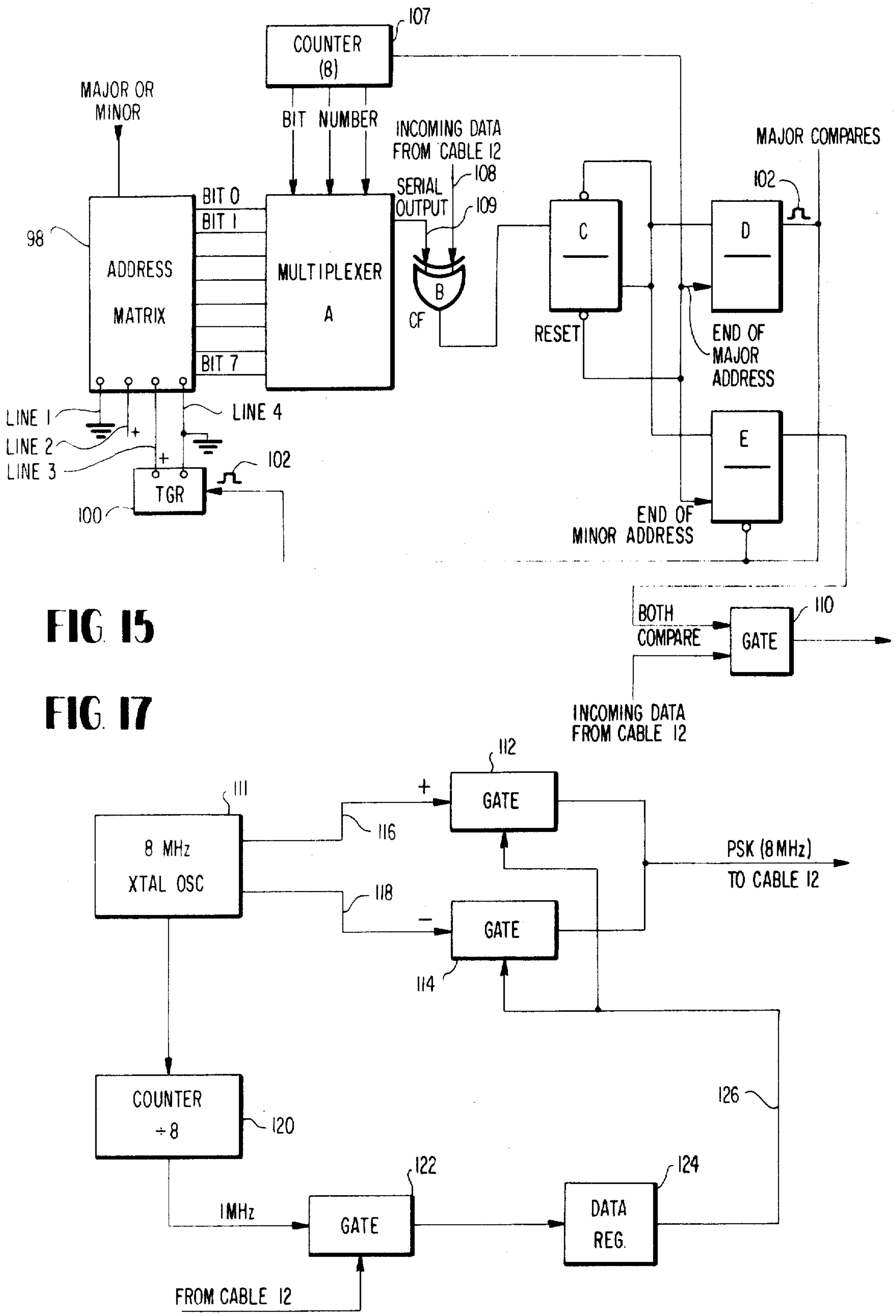
FIG. 15 is a block diagram of the address recognition system of a terminal.
FIG. 17 is a diagram of a dual purpose oscillator circuit.

FIG. 15 illustrates in even more detail the logic and operation of the terminal address recognition block 94 shown in FIG. 10. The eight bit lines of the address matrix 98 are connected to a multiplexer A which sequentially samples the bit lines under the control of a three-stage binary counter 107 having a maximum count of eight. Consequently, the bits stored in parallel in the address matrix 98 appear serially on the output line 108 of the multiplexer and are compared serially, bit by bit, in the comparator B with the incoming address bits from cable 12 which appear on the input line 109 of the comparator. If any one of the stored eight bits does not match the corresponding incoming bit, a latch C is set and remains set until the end of the eight address bits, thereby inhibiting the setting of the latch D. However, if all eight bits match, latch D is not inhibited, and at the count of eight the counter output sets latch D to generate the control pulse 102 which changes the state of the trigger 100 to set the address matrix 98 to the predetermined minor address as described above. The latch C is also reset at this time, and the following minor address is also serialized and compared in the same manner. The setting of latch D by a major address comparison also conditions a latch E. However, if a mismatch in the minor addresses sets latch C, latch E is inhibited for the duration of the minor address. However, if no mismatch occurs in the minor addresses, latch E is not inhibited, and at the end of the minor address at the count of eight, counter 107 sets latch E to open gate 110 and permits the following incoming data from cable 12 to be transmitted to the command register.

Figure 16:
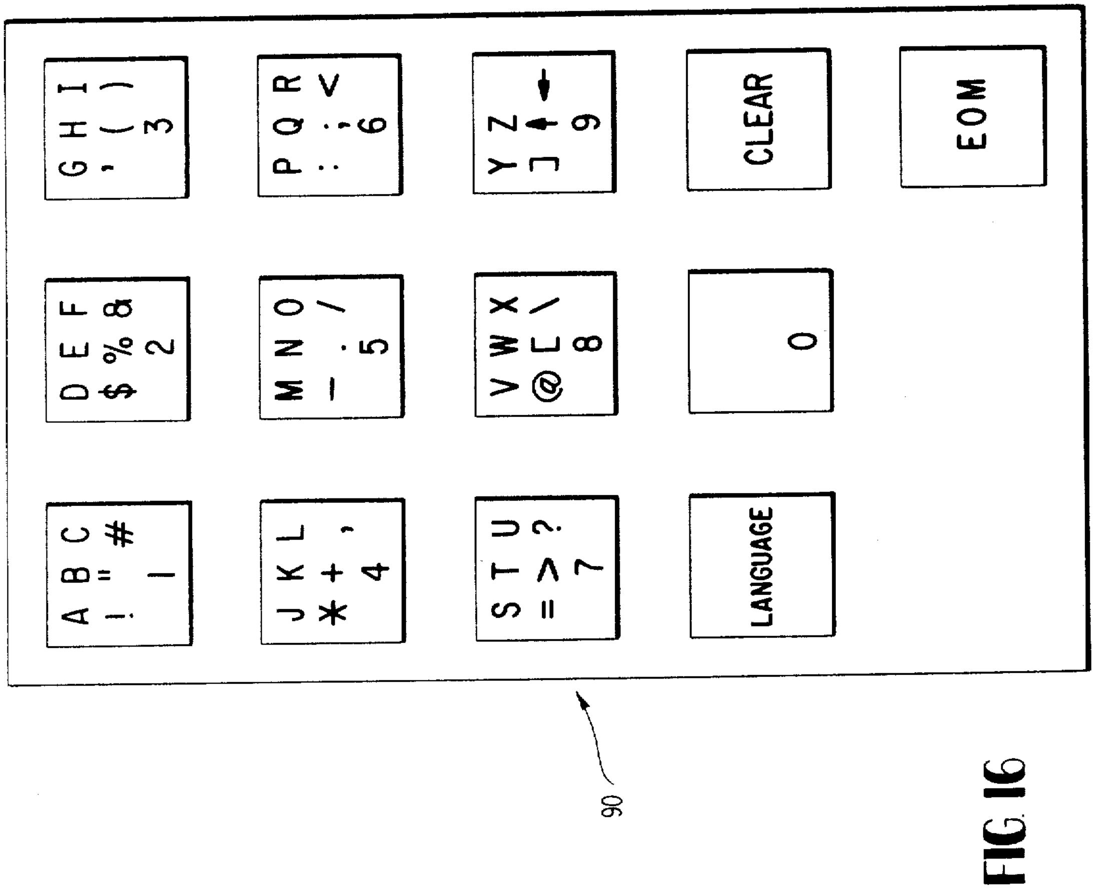
FIG. 16 illustrates a two-stroke keyboard.

FIG. 16 schematically illustrates a novel two-stroke keyboard which may be used as the keyboard 90 illustrated in FIG. 10. The keyboard has an appearance generally similar to the ten button touch tone telephone, but is a digital encoder. The nine buttons bearing the numerals 1–9 contain three rows of symbols, i.e., alphabetical characters, punctuation marks, and a numeral. The keyboard is designed to require two strokes of a button or a single stroke for two different buttons in order to enter a character. For example, to enter an alphabetical character, the button bearing that character is first pressed, and then the button carrying the numeral corresponding to the position of the character on the first button is pressed. More specifically, if it is desired to enter the latter P, the number 6 button is first pressed, followed by pressing of the number 1 button.

In order to enter a punctuation symbol, the button bearing the symbol is first pressed, followed by pressing of either button 4, 5 or 6, depending upon whether the punctuation symbol is in the first, second or third position, respectively, on the first button.

To enter a number, the button bearing the number is pressed followed by pressing of the 0 button.

The LANGUAGE button is pressed to indicate to the computer a special application and it is then followed by the desired two stroke code.

The keyboard 90 also includes a CLEAR button to erase an erroneous entry and an EOM button to indicate the end of a message.

This novel two-stroke keyboard reduces the number of buttons needed to enter numerals, alphabetic characters, special characters, and special applications or functions from the typical 50 to 100 keys on a typewriter to between 10 and 15 keys. Of course, the keyboard could be encoded to require more than two strokes. This multiple stroke and coding scheme operates such that each depression of a key or a button sends partial data back to the control computer. The computing power of the computer is then called upon to combine the returning partial codes in groups of two or more to form complete character codes. The keyboard arrangement shown in FIG. 15 is configured to return 64 codes in a two stroke format using 10 keys.

The second feature of this novel keyboard is the generation of certain aids to the operator of such a keyboard to help in the composition of the multi-stroke message and to indicate by appropriate feedback that the key stroke was, in fact, transmitted. These aids may be used singly or in combination as required by the situation.

The first of these aids is a counter contained within the terminal and which cyclically follows the multi-stroke code and provides a display to the user to prevent confusion due to a loss of proper sequence. In the case of the two stroke code example, this display might be generated by a mod-2 digital counter, with the counter state displayed by an indicating device on the keyboard. As a further aid, the counter may be prevented from operating unless the terminal is being interrogated, thus providing immediate feedback of a malfunction or loss of service for any reason.

A similar aid results if a short audio tone or beep is generated each time a button is pressed so long as the terminal is being interrogated. Such a beep tone provides a positive reinforcement of the action of pressing a button, which is very important if the button itself does not provide a positive feel, and also provides reassurance that the terminal is being interrogated.

Computer generated information such as data, TV signals and FM programming, are transmitted via the cable in the forward direction in the 54 MHz to 300 MHz band. A directional coupler removed a sample of these signals to operate the command receiver in the terminal. In the exemplary embodiment of this invention, data from the control computer is transmitted via the FSK transmitter in the interface 14 on 110 MHz and 112 MHz carriers. A high pass filter in the terminal passes the other signals on to the terminal IV set, converter, FM splitter, etc. Return data from a remote terminal is transmitted via the cable to the computer by the PSM transmitter in the terminal and on an 8 MHz carrier.

Another novel feature of this invention is using a single 8 MHz crystal oscillator to provide both the 8 MHz reverse carrier and also the 1 mega-bit clock pulses required for clocking data in the terminal.

Such a dual purpose oscillator circuit is illustrated in FIG. 17 where it forms part of the PSK terminal transmitter. The binary output of an eight MHz crystal oscillator 111 is applied to the enabling inputs of gates 112 or 114 via lines 116 and 118, respectively, to perform the phase shift key modulation function of the terminal transmitter. These gates are alternately opened and closed by the output of a data register. The output of the oscillator 111 is also applied to a counter 120 which divides the oscillator frequency down to 1 MHz to provide the one mega-bit clock pulses for gating the data from cable 12 through a date 122 and into the data shift register 124. These same clock pulses also gate data out of register 124 via line 126 and through the gates 112 and 114 which output the data to cable 12 on a PSK modulated return carrier of 8 MHz.

Another aspect of this invention is the provision of an improved overtone crystal oscillator which may be used in place of the crystal oscillator 111 illustrated in FIG. 17. This aspect of the invention provides an overtone crystal oscillator wherein selection of the appropriate overtone is accomplished without inductors or inductive elements. This circuit is particularly useful for supplying very high rate clock pulses to digital logic circuitry.

FIG. 18 illustrates the well known prior art free running multivibrator relaxation oscillator 130 which is also known as an astable multivibrator, an RC oscillator, etc. Inverters 131 and 132 are logical elements having relatively high input impedance and low output impedance for providing the best results. Capacitor 134 completes the positive fed-back loop, and resistor 133 is a negative feed-back element which discharges the capacitor each cycle and provides for bias into an active region during the build up of oscillations.

Figure 19:
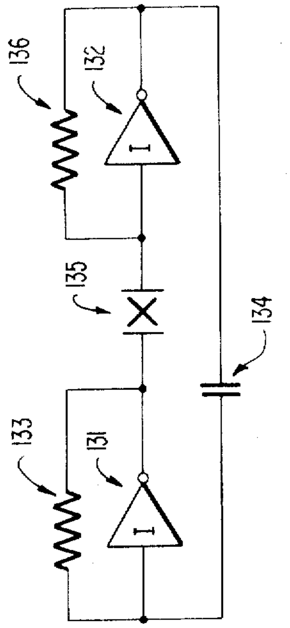
FIG. 19 is a diagram of an improved crystal-controlled overtone oscillator.

FIG. 19 is a schematic diagram illustrating one form of the improved overtone crystal oscillator. Components 131, 132, 133 and 134 correspond to their identically numbered components in FIG. 18 and provide the same functions. A piezoelectric crystal 135 is added as a coupling means between the inverters 131 and 132 and, since the crystal does not pass direct current, a resistor 136 is added to supply bias to the input of inverter 132. It is a characteristic of a piezoelectric crystal to exhibit a marked reduction in impedance and a rapid change in phase shift in the region of resonance. However, there are, in general, several such regions of reasonance, called overtones, which are approximately harmonically related, and the circuit must pick the proper overtone for operation. The circuit of FIG. 19 provides this function by having significant loop gain only near the free running frequency defined by the capacitor 134 and the resistor 133. If the crystal overtone falls within this range, the precise frequency will be determined principally by the crystal.

A schematic diagram of a practical circuit embodying this aspect of the invention is illustrated in FIG. 20. The ECL logic family (MC 1004P) is well suited for such a circuit. The oscillating circuit selects the third crystal overtone at 32.0 MHz. Fixed components are sufficiently accurate for tuning purposes. Invert and non-invert outputs are both utilized to distribute the loads among as many drive ports as possible. Such a circuit may be used as the 1 mega-bit interface clock generator. The clock outputs are down when disabled and also for the first half period at each tap.

Another aspect of this invention is provision of a novel method and circuit for generating a high rate frequency shift keyed FSK signal without producing regions of large phase discontinuity, which would require greater transmission band widths.

Figure 21:
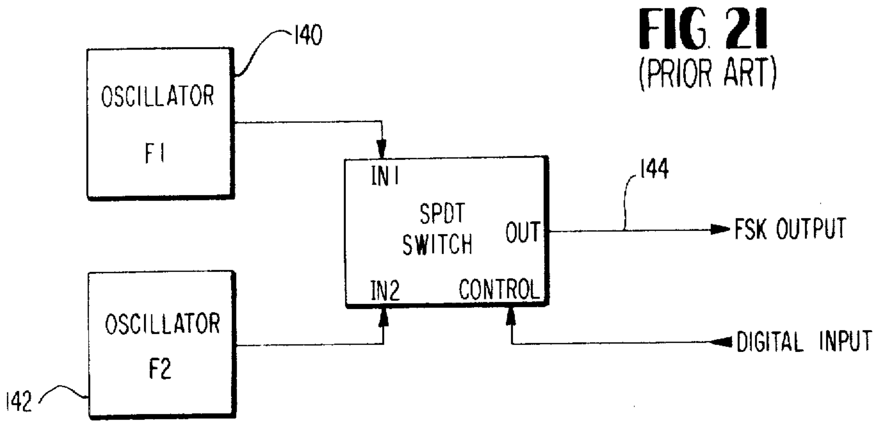
FIG. 21 (PRIOR ART)
FIG. 21 is a block diagram of a prior art FSK oscillator.
Figure 22:
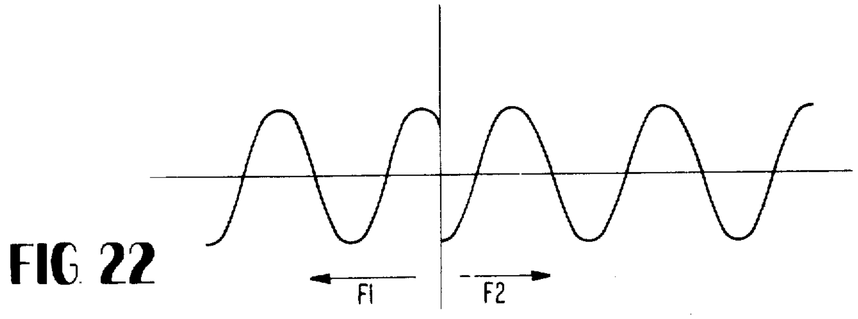
FIG. 22 illustrates the output waveform of the oscillator of FIG. 4.

FIG. 21 is a schematic diagram of a circuit employing a well known method of generating FSK signals. FIG. 22 illustrates the output wave form of such a circuit at the region of frequency change. Any value of phase discontinuity may exist at the transition. The circuit of FIG. 21 includes a first oscillator 140 oscillating at a frequency F1 and a second oscillator 142 oscillating at a frequency F2. The outputs of these two oscillators are fed to the two inputs of a logic circuit functioning as a single pole, double throw switch. The digital input is applied to the control terminal of the switch, and the FSK output appears on the output line 144 of the switch.

Figure 23:
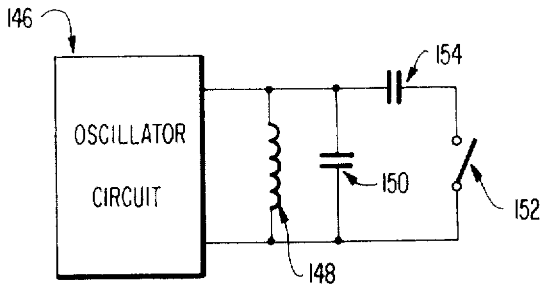
FIGS. 23 and 24 are block diagrams of improved FSK oscillators embodying the invention.

FIG. 23 illustrates one embodiment of this aspect of the invention. Block 146 represents the active portion of any well known oscillator circuit. Inductor 148 and capacitor 150 are portions of the oscillator resonant tank circuit. With the switch 152 closed, a new resonant frequency is determined by the addition of a capacitor 154. Since the instantaneous voltages and current in the tank circuit are only slightly affected by the switch closure, the frequency shift is made without large phase offsets or glitches.

Figure 24:
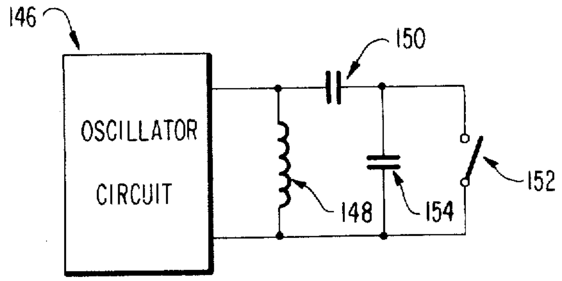

FIG. 24 is another embodiment of this aspect of the invention in which the positin of capacitors 150 and 154 have been changed so that the closure of the switch 152 defines a new resonant frequency by shorting the capacitor 154.

In actual use, the switch 152, illustrates as a mechanical switch, would actually be replaced by a semiconductor switch controlled by the digital keying signal.

An actual circuit embodying this aspect of the invention is schematically illustrated in FIG. 25, and the table of values for the components of this circuit are listed in FIG. 26.

FIG. 27 is schematic logic circuit diagram of the bit stream generator illustrated in block diagram form in FIG. 3.

The foregoing system and method has many applications. One important application is in an automobile assembly plant where each work station is provided with a data terminal. Whenever an operator notices a defect, he presses an appropriate key on his keyboard to enter this information into the terminal. When the terminal is interrogated by the control computer, this information is returned to the control computer and from there to the applications computer where processing thereof may occur. Processed information may be periodically displayed to supervisory personnel who may take the necessary corrective action.

Each terminal may be provided with either a TV receiver or a TV monitor for providing a visual display of either data entered at the keyboard or data transmitted to the terminal from the computer. If a TV monitor is used, a suitable refreshing circuit is used to maintain the display. Even though a full screen display may be made available, one practical embodiment of this invention provides only for a one line, 16 character display which in many applications is sufficient. In this case, the interface generates the television line bit patterns, converts the patterns to a serial bit stream, and transmit the bits in the burst mode, as previously described. Therefore, hardware for forming the bit patterns is not required at each terminal.

While the invention has been particularly shown and described with reference to the preferred embodiments thereof, it will be understood by those skilled in the art that various changes in form and detail may be made therein without departing from the spirit and scope of the invention as defined in the appended claims.

We claim:

1. A variable message length data acquisition and retrieval system for the communication of data between a control computer and a plurality of remote data terminals comprising:

a. a two-way carrier modulated transmission line coupled between the computer and said terminals, b. an interface connected between the computer and said transmission line, said interface comprising:

1. a transmitter for transmitting contiguous data words in a time-multiplexed mode to selected terminals via a forward channel of said transmission line, 2. A receiver for receiving data words from said selected terminals via a return channel of said transmission line, and 3. clock pulse generating means responsive to information in data words returned from the terminal via said computer for varying the length of the data message which is transmitted on said forward channel to the terminal, said information being dependent upon requirements of functions to be performed at a terminal.

2. A system as defined in claim 1 wherein said data words are alphanumeric characters and said terminal comprises data storage means and data display means, said clock pulse generating means being operative to transmit a burst of characters via said forward channel to said storage means, and means coupling said storage means to said display means.

3. A system as defined in claim 1 wherein the data words transmitted by said computer are alphanumeric characters in serial bit form, said interface further comprising means for forming from the serial character bits television line bit patterns representing said characters, and television means at said terminal for displaying one line of characters, said clock pulse generating means being operative to transmit serial-by-bit the bit patterns for one line of characters via said forward channel in a burst mode to said television means.

4. A system as defind in claim 1 wherein the data words transmitted by the computer include a major address and a minor address, address storage means at each terminal for storing the major address and the minor address of that terminal, address comparison means at each terminal for comparing the stored major address with the transmitted major address, means responsive to a match of the stored and transmitted major addresses to condition the comparison means for a subsequent comparison of a transmitted minor address and a stored minor address, and means responsive to a mismatch of the stored and transmitted major addresses for inhibiting the subsequent comparison of the stored minor address and a transmitted minor address.

5. A system as defined in claim 4 wherein said address storage means comprises an address matrix for storing in parallel bit form both the major and minor addresses of the terminal, multiplexing means for converting the stored parallel address into serial bit for comparison in said comparison means on a bit-by-bit basis with the bits of the addresses transmitted by the computer.

6. A system as defined in claim 5 wherein said address matrix comprises a circuit board, a plurality of spaced parallel bit conductors on one surface of the board and being equal in number to the number of bits in each of said major and minor addresses, a plurality of control conductors on the opposite surface of said board and extending at right angles to said bit conductors, a through-hole extending through the board at the overlapping points of each pair of bit and control conductors, means connecting the bit conductors to said multiplexing means, means fixing one pair of said control conductors at two different voltage polarities, switch means for selectively applying a different one of said two polarities to each of another pair of two control conductors, said switch means being responsive to a major address to apply one combination of said two polarities to said other pair of control conductors and responsive to a minor address to apply the opposite combination of said two polarities to said other pair of control conductors, and means for electrically interconnecting said bit conductors and said control conductors through said through-holes in a combinatorial pattern corresponding to the major and minor addresses of the terminal, whereby the voltage polarities appearing on the said bit conductors represent the major and minor addresses of the terminal.

7. A system as defined in claim 1 wherein said transmission line is a multiple channel CATV coaxial cable.

8. A system as defined in claim 1 wherein said transmitter is a frequency shift keyed modulated transmitter and said receiver is a phase shift keyed receiver.

* * * * *